(12) United States Patent
Stauffer et al.

(10) Patent No.: US 11,408,973 B2
(45) Date of Patent: Aug. 9, 2022

(54) CONTROLLING RADAR TRANSMISSIONS WITHIN A LICENSED FREQUENCY BAND

(71) Applicant: Google LLC, Mountain View, CA (US)

(72) Inventors: Erik Richard Stauffer, Sunnyvale, CA (US); Jibing Wang, Saratoga, CA (US); Srenik Suresh Mehta, Fremont, CA (US)

(73) Assignee: Google LLC, Mountain View, CA (US)

( * ) Notice: Subject to any disclaimer, the term of this patent is extended or adjusted under 35 U.S.C. 154(b) by 261 days.

(21) Appl. No.: 16/144,199

(22) Filed: Sep. 27, 2018

(65) Prior Publication Data

US 2020/0107249 A1    Apr. 2, 2020

(51) Int. Cl.
| | | |
|---|---|---|
| *G01S 7/02* | (2006.01) | |
| *G01S 13/42* | (2006.01) | |
| *H04W 48/14* | (2009.01) | |
| *H04W 72/14* | (2009.01) | |
| *G01S 13/72* | (2006.01) | |

(Continued)

(52) U.S. Cl.
CPC ............ *G01S 7/0232* (2021.05); *G01S 7/023* (2013.01); *G01S 7/0234* (2021.05); *G01S 13/42* (2013.01); *G01S 13/72* (2013.01); *H04W 48/14* (2013.01); *H04W 72/0453* (2013.01); *H04W 72/14* (2013.01); *H04W 84/045* (2013.01)

(58) Field of Classification Search
USPC .......................................................... 370/329
See application file for complete search history.

(56) References Cited

U.S. PATENT DOCUMENTS

| | | |
|---|---|---|
| 8,064,475 B2 | 11/2011 | Henry |
| 9,594,153 B1 | 3/2017 | Oroskar et al. |

(Continued)

FOREIGN PATENT DOCUMENTS

| | | |
|---|---|---|
| EP | 3226598 | 10/2017 |
| WO | 2017195152 | 11/2017 |
| WO | 2020068396 | 4/2020 |

OTHER PUBLICATIONS

"International Search Report and Written Opinion", PCT Application No. PCT/US2019/049952, dated Nov. 21, 2019, 13 pages.

(Continued)

*Primary Examiner* — Gregory B Sefcheck
*Assistant Examiner* — Majid Esmaeilian
(74) *Attorney, Agent, or Firm* — Colby Nipper PLLC (57) ABSTRACT

This document describes techniques and devices for controlling radar transmissions within a licensed frequency band. In particular, a network is given control over whether or not a user equipment 110 transmits a radar signal within at least a portion of one or more licensed frequency bands associated with coverage of the network. With this control, the network can balance the use of the licensed frequency band for wireless communication operations and radar-based applications. The network can further control operations of the user equipment 110's radar system to control an amount of interference that is present within the licensed frequency band. With permission from the network via a radar grant message 524, the radar system can utilize frequencies within the licensed frequency band for radar-based applications, such as gesture recognition, presence detection, collision avoidance, and so forth.

22 Claims, 7 Drawing Sheets

(51) Int. Cl.
*H04W 72/04* (2009.01)
*H04W 84/04* (2009.01)

(56) References Cited

U.S. PATENT DOCUMENTS

| | | | |
|---|---|---|---|
| 9,775,168 B2* | 9/2017 | Langereis | H04B 1/40 |
| 2015/0063321 A1* | 3/2015 | Sadek | H04K 3/822 |
| | | | 370/336 |
| 2015/0237645 A1 | 8/2015 | Andrianov et al. | |
| 2015/0326372 A1 | 11/2015 | Ghosh | |
| 2016/0233989 A1* | 8/2016 | Belghoul | H04L 5/001 |
| 2017/0134961 A1* | 5/2017 | Ghosh | H04L 67/1097 |
| 2018/0242182 A1* | 8/2018 | Rashid | H04W 88/06 |
| 2018/0249454 A1 | 8/2018 | Erceg et al. | |
| 2018/0249468 A1 | 8/2018 | Erceg et al. | |
| 2018/0332660 A1 | 11/2018 | Mueck et al. | |
| 2020/0025865 A1* | 1/2020 | Gulati | H04B 1/69 |

OTHER PUBLICATIONS

"Written Opinion", PCT Application No. PCT/US2019/049952, dated Apr. 23, 2020, 8 pages.
"International Preliminary Report on Patentability", Application No. PCT/US2019/049952, dated Dec. 22, 2020, 22 pages.
"Foreign Office Action", IN Application No. 202147007554, dated Jan. 24, 2022, 6 pages.

* cited by examiner

CONTROLLING RADAR TRANSMISSIONS WITHIN A LICENSED FREQUENCY BAND

BACKGROUND

Radars are useful devices that can detect and track objects. While radar is a common tool used in military and air-traffic-control operations, technological advances are making it possible to integrate radars in commercial devices. In many cases, a radar may replace bulky and expensive sensors, such as a camera, and provide improved performance in the presence of different environmental conditions, such as low lighting and fog, or with moving or overlapping objects. While it may be advantageous to use radar, there are many challenges associated with operating radar in electronic devices.

One such problem involves the potential interference a radar may generate. If the radar utilizes similar frequencies as those used for wireless communications, for example, radar operations may decrease sensitivity of an electronic device or introduce additional noise within the environment, which can make it challenging to receive wireless communication signals over farther distances or to correctly decode received information. In some cases, the interference generated by the radar may adversely impact other proximate electronic devices. As a result, the radar can cause the electronic device to miss a phone call, exhibit poor call quality, or experience a longer delay in downloading information, thereby frustrating users.

SUMMARY

Techniques and apparatuses are described for controlling radar transmissions within a licensed frequency band. In particular, a network is given control over whether or not a user equipment (UE) transmits a radar signal within at least a portion of one or more licensed frequency bands associated with coverage of the network. With this control, the network can balance the use of the licensed frequency band for wireless communication operations and radar-based applications. The network can further coordinate timing or frequency resources used for radar operations to control an amount of interference that is present within the licensed frequency band. The UE includes a radar request module that controls an operation of a radar system. In some cases, the radar request module sends a radar request message to a base station requesting authorization to operate the radar system within the licensed frequency band. The base station includes a radar grant module that transmits a radar grant message to the UE informing the radar request module of whether the request is granted or denied, or if there are any contingencies. The radar request module appropriately configures the radar system based on the radar grant message. With permission from the network, the radar system may utilize the frequencies within the licensed frequency band for radar-based applications, such as gesture recognition, presence detection, collision avoidance, and so forth.

Aspects described below include a method for a user equipment for controlling radar transmissions within a licensed frequency band. The method includes transmitting a radar request message to a base station to request permission for transmitting a radar signal within at least a portion of a licensed frequency band. The method also includes receiving a radar grant message from the base station providing authorization to transmit the radar signal within the licensed frequency band. The method additionally includes causing a radar system within the user equipment to transmit the radar signal responsive to the receiving of the radar grant message.

Aspects described below include a user equipment with a radar system and a radar request module. The radar system is configured to transmit a radar signal using at least a portion of a licensed frequency band. The radar request module is coupled to the radar system and is configured to cause the user equipment to transmit a radar request message to a base station prior to the radar system transmitting the radar signal. The radar request message notifies the base station of an intent to transmit the radar signal.

Aspects described below include a base station with a radar grant module. The radar grant module is configured to transmit a radar grant message to a user equipment providing authorization for the user equipment to transmit a radar signal within at least a portion of a licensed frequency band.

Aspects described below also include a system with means for controlling radar transmissions within a licensed frequency band.

BRIEF DESCRIPTION OF THE DRAWINGS

Apparatuses of and techniques for controlling radar transmissions within a licensed frequency band are described with reference to the following drawings. The same numbers are used throughout the drawings to reference like features and components.

DETAILED DESCRIPTION

Overview

This document describes techniques and devices for controlling radar transmissions within a licensed frequency band. Some wireless communication network providers pay a licensing fee for transmission rights within a portion of a frequency spectrum (e.g., within a licensed frequency band). With the evolution of wireless communications to Fifth-Generation (5G) standards, some frequencies between approximately 6 and 300 gigahertz (GHz) may be licensed to different network providers. While these frequencies may support higher data rates and greater capacity for wireless communications, they may also be advantageous in other applications, such as those that utilize radar sensing operations. In particular, a radar that operates within an extremely-high frequency spectrum can be implemented within a small package and fit within space-constrained devices. Furthermore, use of these frequencies can increase the radar's Doppler sensitivity and enable the radar to produce narrower beamwidths with fewer antennas.

Some network providers may choose to restrict access to the licensed frequency band for radar sensing operations to reduce a possibility of radar transmissions interfering with and degrading wireless communication operations. Without permission from the network provider, radar operations may be limited to unlicensed frequency bands. The use of unlicensed frequency bands, however, may limit the radar's ability to select an appropriate frequency or bandwidth for detecting objects. Consequently, some objects may not be detected by the radar if the selected frequency causes a radial velocity of the desired object to correspond with a radar blind speed (e.g., to occur within a Doppler blind of the radar) or causes the object to have a small radar cross section. Additionally, a substantial amount of interference may be present within the unlicensed frequency band from transmissions of other nearby devices. This interference may make it challenging for the radar system to achieve a desired level of accuracy, probability of detection, or false alarm rate.

The techniques and devices described control radar transmissions within a licensed frequency band. In particular, a network is given control over whether or not a user equipment (UE) transmits a radar signal within at least a portion of one or more licensed frequency bands associated with coverage of the network. With this control, the network can balance the use of the licensed frequency band for wireless communication operations and radar-based applications. The network can further coordinate timing or frequency resources used for radar operations to control an amount of interference that is present within the licensed frequency band. The UE includes a radar request module that controls an operation of a radar system. In some cases, the radar request module sends a radar request message to a base station requesting authorization to operate the radar system within the licensed frequency band. The base station includes a radar grant module that transmits a radar grant message to the UE informing the radar request module of whether the request is granted or denied, or if there are any contingencies. The radar request module appropriately configures the radar system based on the radar grant message. With permission from the network, the radar system may utilize the frequencies within the licensed frequency band for radar-based applications, such as gesture recognition, presence detection, collision avoidance, and so forth.

Example Environment

Figure 1:
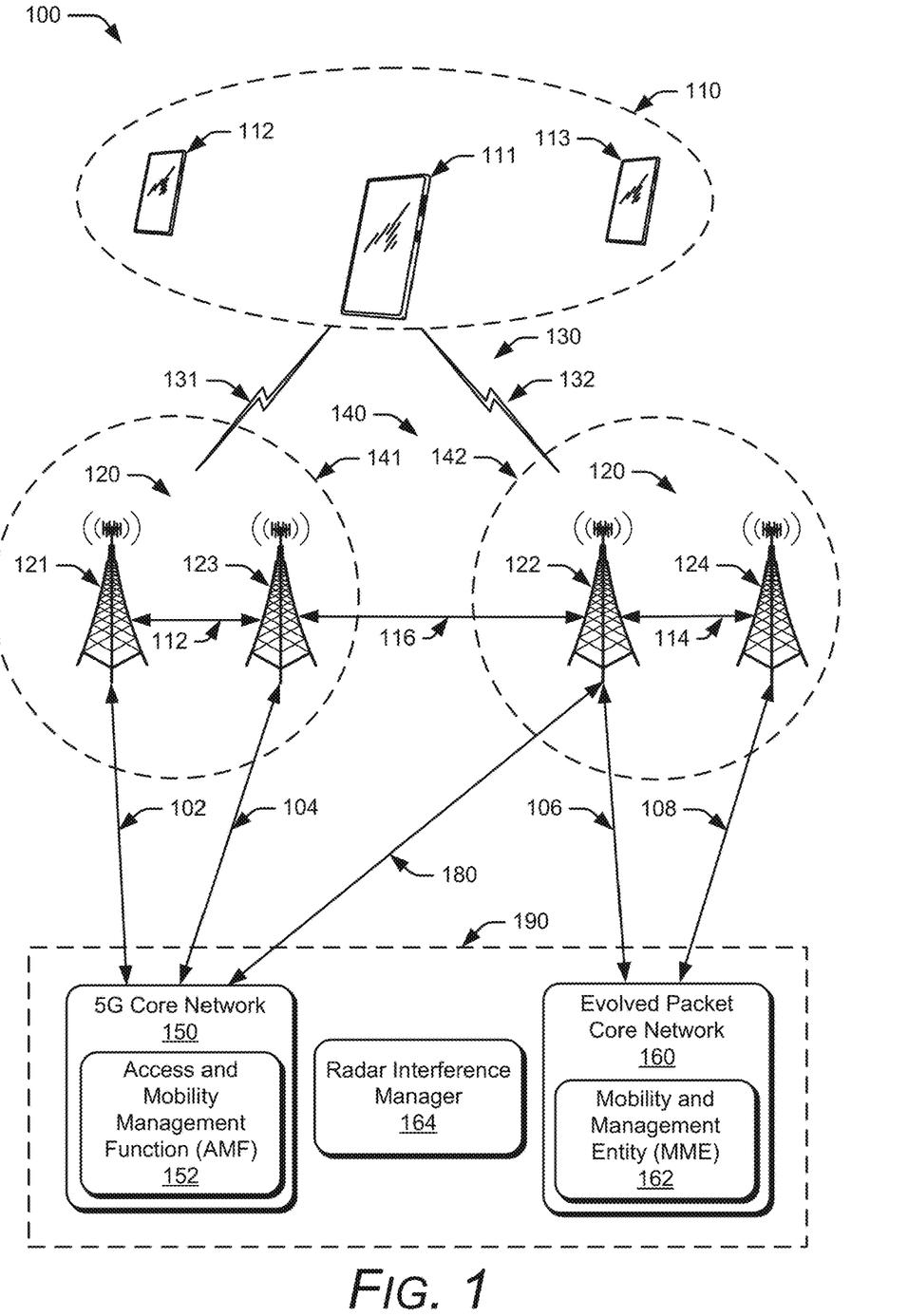
FIG. 1 illustrates an example wireless network environment in which controlling radar transmissions within a licensed frequency band can be implemented.

FIG. 1 illustrates an example environment 100, which includes multiple user equipment 110 (UE 110), illustrated as UE 111, UE 112, and UE 113. Each UE 110 can communicate with one or more base stations 120 (illustrated as base stations 121, 122, 123, and 124) through one or more wireless communication links 130 (wireless link 130), illustrated as wireless links 131 and 132. In this example, the UE 110 is implemented as a smartphone. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. One or more of the multiple UEs 110 can include a radar system, as further described with respect to FIG. 2. With the radar system, the UE 110 can perform radar operations to recognize gestures, detect a presence of a user, provide collision avoidance, and so forth. The radar system can be capable of transmitting radar signals with frequencies that are within at least a portion of a licensed frequency band used for wireless communications. The base stations 120 (e.g., an Evolved Universal Terrestrial Radio Access Network Node B, E-UTRAN Node B, evolved Node B, eNodeB, eNB, Next Generation Evolved Node B, ng-eNB, Next Generation Node B, gNode B, gNB, or the like) may be implemented in a macrocell, microcell, small cell, picocell, or the like, or any combination thereof.

The base stations 120 communicate with the UE 110 via the wireless links 131 and 132, which may be implemented as any suitable type of wireless link. The wireless link 131 and 132 can include a downlink of data and control information communicated from the base stations 120 to the UE 110, an uplink of other data and control information communicated from the UE 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Enhanced Long-Term Evolution (eLTE), Fifth-Generation New Radio (5G NR), Fourth-Generation (4G) standard, and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (RAN, Evolved Universal Terrestrial Radio Access Network, E-UTRAN, 5G NR RAN or NR RAN). The RANs 140 are illustrated as a NR RAN 141 and an E-UTRAN 142. In FIG. 1, core networks 190 is shown to include a Fifth-Generation Core (5GC) network 150 (5GC 150) and an Evolved Packet Core (EPC) network 160 (EPC 160), which are different types of core networks. The base stations 121 and 123 in the NR RAN 141 are connected to the 5GC 150. The base stations 122 and 124 in the E-UTRAN 142 are connected to the EPC 160. Optionally or additionally, the base station 122 may connect to both the 5GC 150 and EPC 160 networks.

The base stations 121 and 123 connect, at 102 and 104 respectively, to the 5GC 150 via an NG2 interface for control-plane signaling and via an NG3 interface for user-plane data communications. The base stations 122 and 124 connect, at 106 and 108 respectively, to the EPC 160 via an S1 interface for control-plane signaling and user-plane data communications. Optionally or additionally, if the base station 122 connects to the 5GC 150 and EPC 160 networks, the base station 122 connects to the 5GC 150 via an NG2 interface for control-plane signaling and via an NG3 interface for user-plane data communications, at 180.

In addition to connections to core networks 190, base stations 120 may communicate with each other. The base stations 121 and 123 communicate via an Xn interface at 112. The base stations 122 and 124 communicate via an X2 interface at 114.

The 5GC 150 includes an Access and Mobility Management Function 152 (AMF 152) that provides control-plane functions such as registration and authentication of multiple UE 110, authorization, mobility management, or the like in the 5G NR network. The EPC 160 includes a Mobility Management Entity 162 (MME 162) that provides control-plane functions such as registration and authentication of multiple UE 110, authorization, mobility management, or the like in the E-UTRA network. The AMF 152 and the MME 162 communicate with the base stations 120 in the RANs 140 and also communicate with multiple UE 110, via the base stations 120. One or more of the multiple UE 110 may include a radar system, as further described with respect to FIG. 2.

One or more of the core networks 190 include a radar interference manager 164. For example, the 5GC 150 can include the radar interference manager 164, which can be integrated within a server of the 5GC 150 or within the AMF 152. Generally, the radar interference manager 164 can communicate with the AMF 152 or can access information or functionality within the AMF 152. The radar interference manager 164 controls an amount of interference generated by radar operations within coverage of the network. In other words, the radar interference manager 164 coordinates usage of a licensed frequency band for radar transmissions and controls a distribution of grants for utilizing the licensed frequency band for radar operations. The radar interference manager 164 is further described with respect to FIG. 5.

Figure 2:
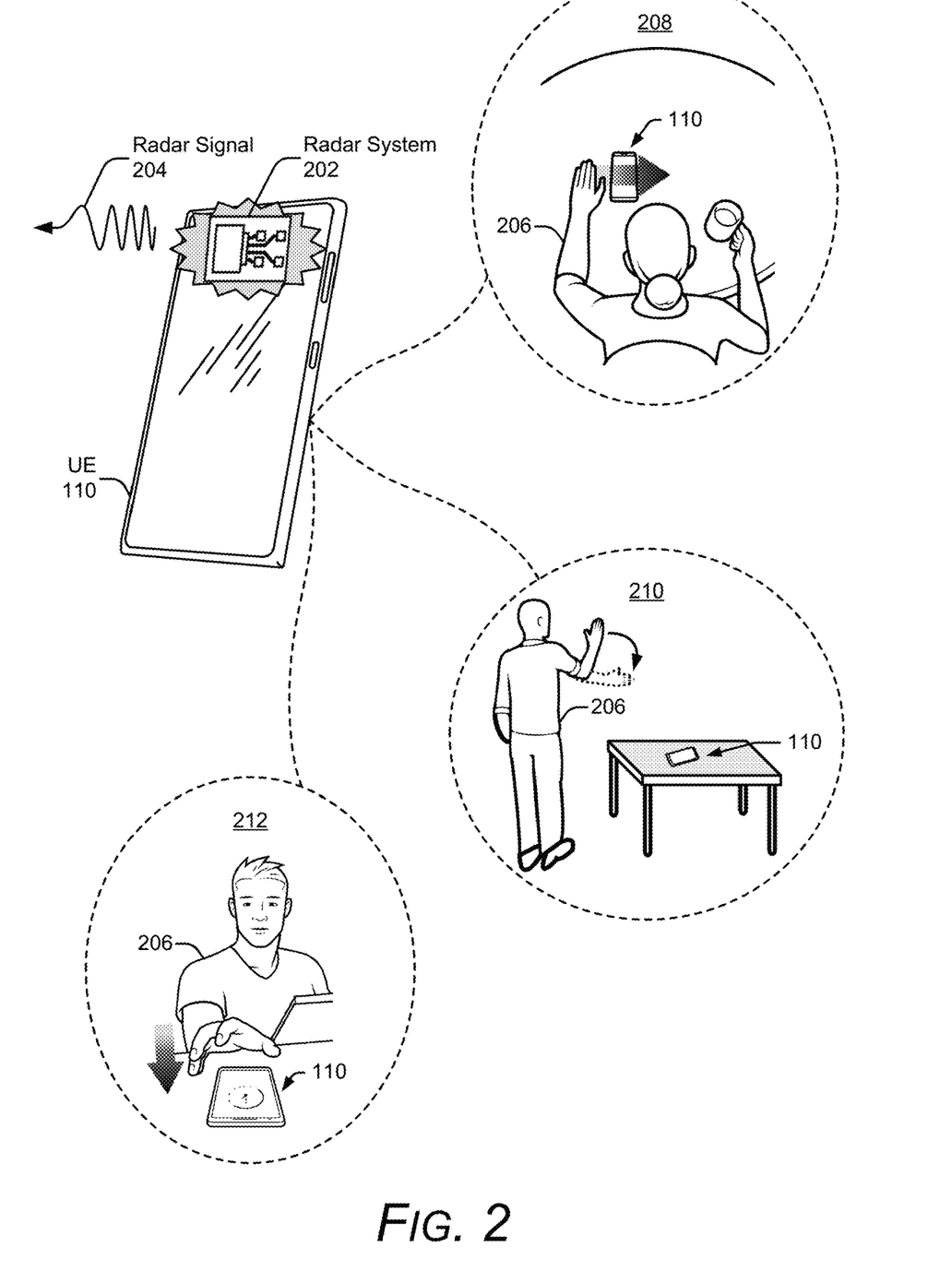
FIG. 2 illustrates example environments for operating a radar system within a licensed frequency band.

FIG. 2 illustrates example environments for operating a radar system 202 within a licensed frequency band. In the depicted configuration, the radar system 202 is integrated within the UE 110. In some cases, the radar system 202 can transmit a radar signal 204 using at least a portion of a licensed frequency band. By analyzing reflections from the radar signal 204, the radar system 202 can detect and track an object, such as a user, a portion of the user (e.g., an appendage or body part), an animal, an inanimate object (e.g., a vehicle or an obstacle), and so forth. In this manner, the radar system 202 can track a user 206's gesture for touch-free control, detect a presence of one or more users 206, track one or more users 206 around the UE 110 for specific applications, provide collision avoidance for assisted driving applications, and so forth. The radar system 202 is further described with respect to FIG. 4. A variety of different types of gestures can be recognized by the UE 110 using the radar system 202, as further described below.

In the environment 208, the user 206 makes a scrolling gesture by moving a hand above the UE 110 along a horizontal axis (e.g., from a left side of the UE 110 to a right side of the UE 110). A waving gesture is made by another user 206 in the environment 210 as the user 206's arm rotates about an elbow. In the environment 212, a user 206 reaches for the UE 110 by moving a hand towards the UE 110. Other types of gestures or motions may also be made. For example, a knob-turning gesture may be made by curling fingers of a hand to grip an imaginary door knob. The fingers and hand are rotated in a clockwise or counter-clockwise fashion to mimic an action of turning the imaginary door knob. Another example spindle-twisting gesture may be performed by rubbing a thumb and at least one other finger together. Still other types of gestures include a two-finger pinch and spread, a finger tap, multi-dimensional gestures usable with touch-sensitive displays, sign-language gestures, and so forth. Each of these example gesture types may be detected by the radar system 202. Upon detecting a gesture, the UE 110 may perform an action, such as display new content, move a cursor, activate one or more sensors, open an application, and so forth. In this way, the radar system 202 provides touch-free control of the UE 110.

Example Devices

Figure 3:
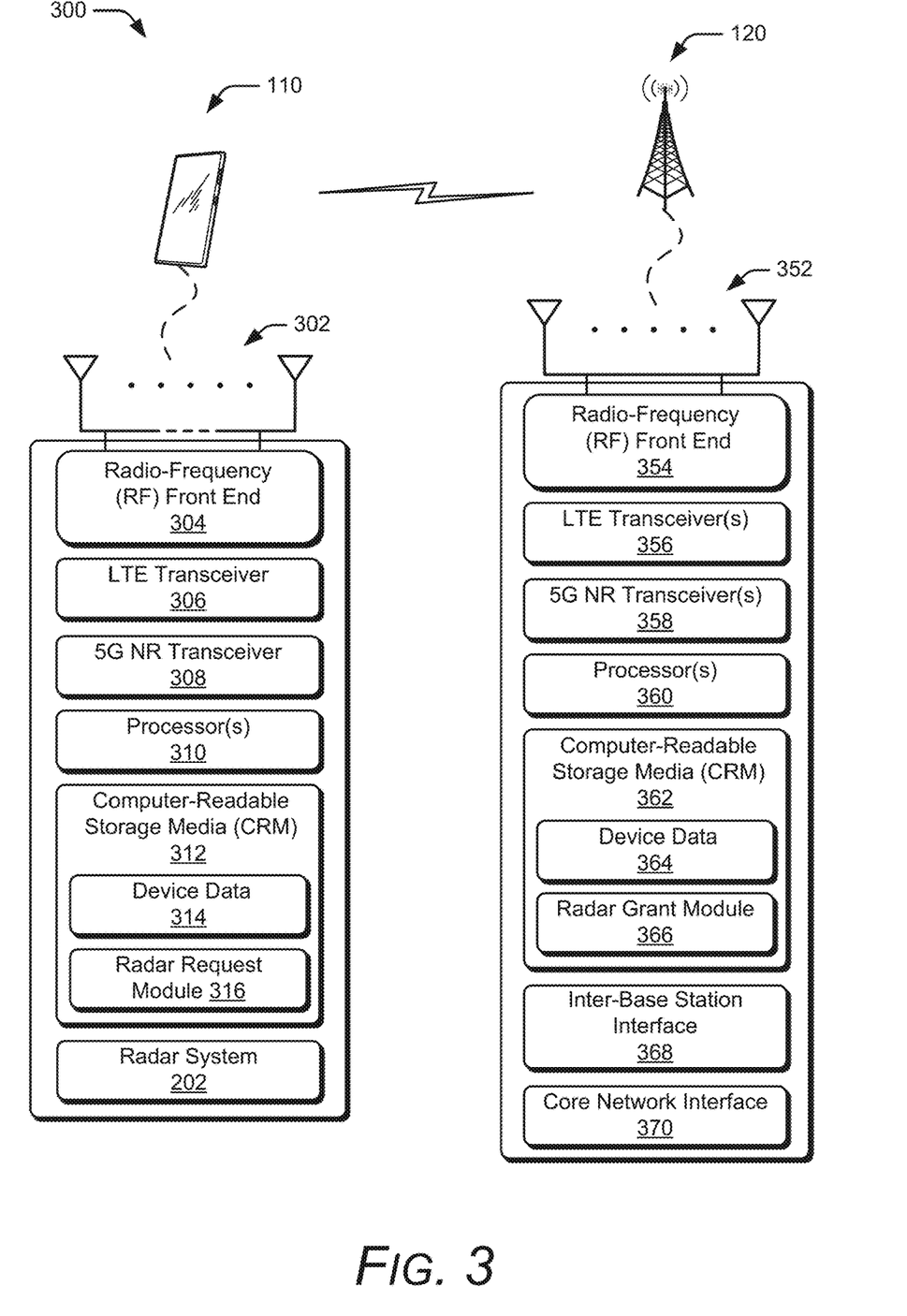
FIG. 3 illustrates an example device diagram of a user equipment and a base station.

FIG. 3 illustrates an example device diagram 300 of the UE 110 and the base station 120. The UE 110 and the base station 120 may include additional functions and interfaces that are omitted from FIG. 3 for the sake of clarity. The UE 110 includes antennas 302, a radio-frequency (RF) front end 304 (RF front end 304), an LTE transceiver 306, and a 5G NR transceiver 308 for communicating with base stations 120 in the 5G RAN 141 and/or the E-UTRAN 142. The RF front end 304 of the UE 110 can couple or connect the LTE transceiver 306 and the 5G NR transceiver 308 to the antennas 302 to facilitate various types of wireless communication. The antennas 302 of the UE 110 may include an array of multiple antennas that are configured similar to or differently from each other. The antennas 302 and the RF front end 304 can be tuned to, and/or be tunable to, one or more frequency bands defined by the 3GPP LTE and 5G NR communication standards and implemented by the LTE transceiver 306, and/or the 5G NR transceiver 308. Additionally, the antennas 302, the RF front end 304, the LTE transceiver 306, and/or the 5G NR transceiver 308 may be configured to support beamforming (e.g., analog or digital), duplex operation (e.g., full-duplex or half-duplex operation), or in-phase and quadrature (I/Q) operations (e.g., I/Q modulation or demodulation operations) for the transmission and reception of communications with the base stations 120. By way of example and not limitation, the antennas 302 and the RF front end 304 can be implemented for operation in sub-gigahertz bands, sub-6 GHZ bands, and/or bands with frequencies between approximately 6 and 300 GHz that are defined by the 3GPP LTE and 5G NR communication standards. In some cases, the antennas 302 and the RF front end 304 can be implemented for operation in the extremely-high frequency spectrum (e.g., for frequencies that are between approximately 24 and 300 GHz).

The UE 110 also includes processor(s) 310 and computer-readable storage media 312 (CRM 312). The processor 310 may be a single core processor or a multiple core processor composed of a variety of materials, such as silicon, poly-silicon, high-K dielectric, copper, and so on. The computer-readable storage media described herein excludes propagating signals. CRM 312 may include any suitable memory or storage device such as random-access memory (RAM), static RAM (SRAM), dynamic RAM (DRAM), non-volatile RAM (NVRAM), read-only memory (ROM), or Flash memory useable to store device data 314 of the UE 110. The device data 314 includes user data, multimedia data, beam-forming codebooks, applications, and/or an operating system of the UE 110, which are executable by processor(s) 310 to enable user-plane communication, control-plane signaling, and user interaction with the UE 110.

CRM 312 also includes a radar request module 316. Alternately or additionally, the radar request module 316 may be implemented in whole or part as hardware logic or circuitry integrated with or separate from other components of the UE 110. In at least some aspects, the radar request module 316 configures the LTE transceiver 306 or the 5G NR transceiver 308 for communication with the base station 120. In this way, the radar request module 316 can send a radar request message to the base station 120 or receive a radar grant message from the base station 120, as further described with respect to FIG. 5.

The radar request module 316 also configures the radar system 202 according to instructions obtained from the radar interference manager 164. If radar transmissions are authorized, the radar request module 316 enables the radar system 202 to transmit the radar signal 204 within at least a portion of the authorized licensed frequency band. If the authorization specifies a contingency, the radar request module 316 causes the radar system 202 to comply with the contingency. If the request is denied, the radar request module 316 prevents the radar system 202 from transmitting the radar signal 204 within the licensed frequency band. In this situation, the radar request module 316 may enable the radar system 202 to utilize an unlicensed frequency band to transmit the radar signal 204 or operate the radar system 202 in a receive mode to employ bistatic or cooperative radar techniques.

The device diagram for the base station 120, shown in FIG. 3, includes a single network node (e.g., a gNode B). The functionality of the base station 120 may be distributed across multiple network nodes or devices and may be distributed in any fashion suitable to perform the functions described herein. The base station 120 includes antennas 352, a radio-frequency (RF) front end 354 (RF front end 354), one or more LTE transceivers 356, and/or one or more 5G NR transceivers 358 for communicating with the UE 110. The RF front end 354 of the base stations 120 can couple or connect the LTE transceivers 356 and the 5G NR transceivers 358 to the antennas 352 to facilitate various types of wireless communication. The antennas 352 of the base station 120 may include an array of multiple antennas that are configured similar to or differently from each other. The antennas 352 and the RF front end 354 can be tuned to, and/or be tunable to, one or more frequency band defined by the 3GPP LTE and 5G NR communication standards, and implemented by the LTE transceivers 356, and/or the 5G NR transceivers 358. Additionally, the antennas 352, the RF front end 354, the LTE transceivers 356, and/or the 5G NR transceivers 358 may be configured to support beamforming, such as Massive-MIMO, for the transmission and reception of communications with the UE 110.

The base stations 120 also include processor(s) 360 and computer-readable storage media 362 (CRM 362). The processor 360 may be a single core processor or a multiple core processor composed of a variety of materials, such as silicon, polysilicon, high-K dielectric, copper, and so on. CRM 362 may include any suitable memory or storage device such as random-access memory (RAM), static RAM (SRAM), dynamic RAM (DRAM), non-volatile RAM (NVRAM), read-only memory (ROM), or Flash memory useable to store device data 364 of the base stations 120. The device data 364 includes network scheduling data, radio resource management data, beamforming codebooks, applications, and/or an operating system of the base stations 120, which are executable by processor(s) 360 to enable communication with the UE 110.

CRM 362 also includes a radar grant module 366. Alternately or additionally, the radar grant module 366 may be implemented in whole or part as hardware logic or circuitry integrated with or separate from other components of the base stations 120. In at least some aspects, the radar grant module 366 configures the LTE transceivers 356 and the 5G NR transceivers 358 for communication with the UE 110, as well as communication with the core network 190. In this manner, the radar grant module 366 can communicate with the radar request module 316. In particular, the radar grant module 366 can receive the radar request message from the UE 110 and transmit the radar grant message to the UE 110, as further described with respect to FIG. 5.

The base stations 120 include an inter-base station interface 368, such as an Xn and/or X2 interface, which the base station manager 366 configures to exchange user-plane and control-plane data between another base station 120, to manage the communication of the base stations 120 with the UE 110. The base station 120 also include a core network interface 370 that the radar grant module 366 configures to exchange information with core network functions and entities, such as the radar interference manager 164. In this manner, the radar grant module 366 can provide information to or obtain information from the radar interference manager 164. The radar interference manager 164 of the core network 190, the radar request module 316 of the UE 110, and the radar grant module 366 of the base station 120 can at least partially control an operation of the radar system 202 as described herein.

Figure 4:
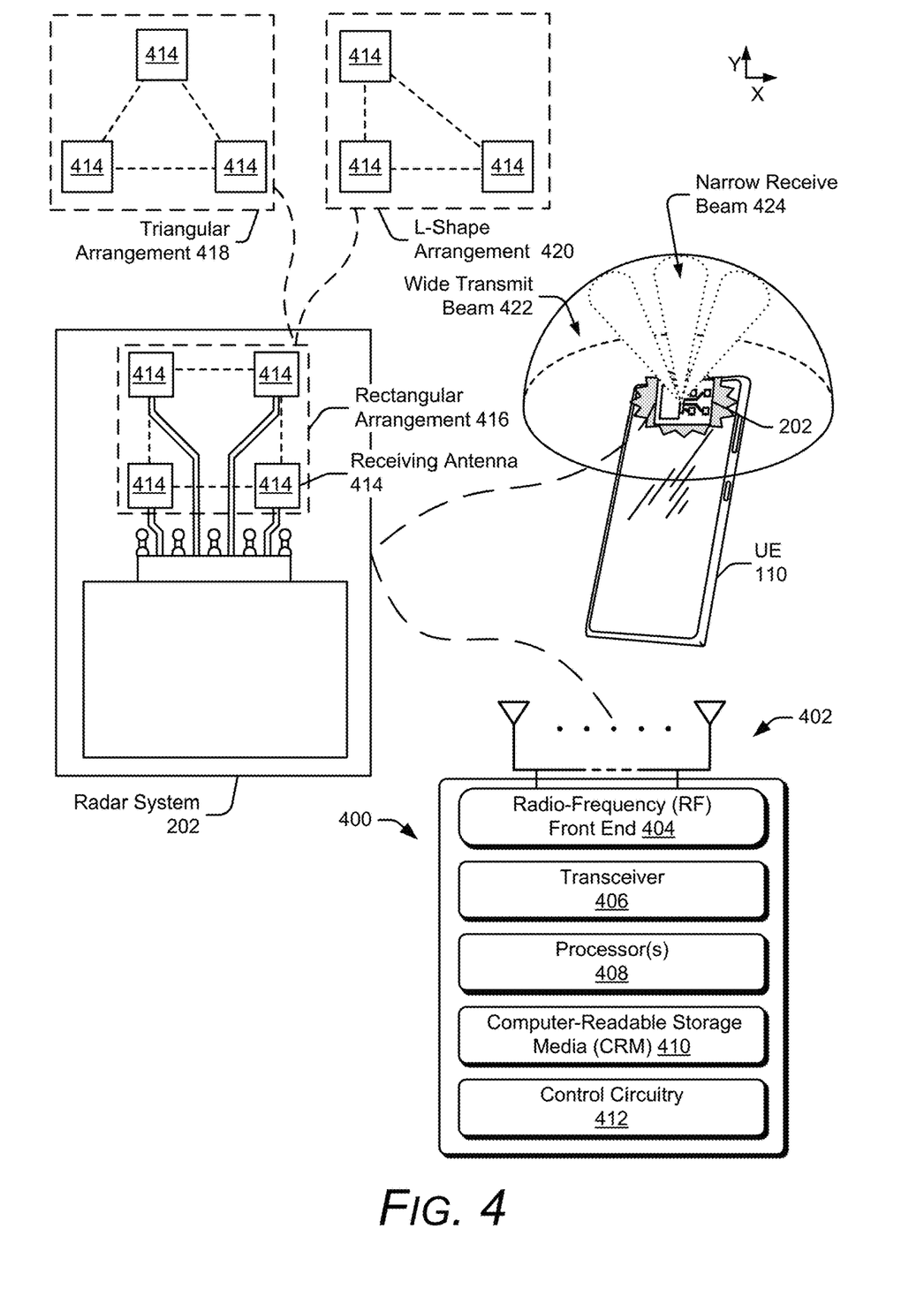
FIG. 4 illustrates an example device diagram of a radar system.

FIG. 4 illustrates an example device diagram 400 of the radar system 202. The radar system 202 may include additional functions and interfaces that are omitted from FIG. 4 for the sake of clarify. The radar system 202 may have a relatively small footprint to fit within a size constraint of the UE 110. For example, dimensions of the radar system 202 may be approximately four millimeters by six millimeters with antennas included. Exemplary power consumption of the radar system 202 may be on the order of a few milliwatts to several milliwatts (e.g., between approximately two milliwatts and twenty milliwatts) to conserver battery power of the UE 110 during mobile operation.

The radar system 202 includes antennas 402, a radio-frequency (RF) front end 404 (RF front end 404), at least one transceiver 406, one or more processors 408, at least one computer-readable storage media 410, and control circuitry 412. The antennas 402 of the radar system 202 may include an array of multiple antennas that are configured similar to or differently from each other. The antennas 402 include at least one transmitting antenna and at least two receiving antennas 414. In some cases, the antennas 402 include multiple transmitting antennas to implement a multiple-input multiple-output (MIMO) radar capable of transmitting multiple distinct waveforms at a given time (e.g., a different waveform per transmitting antenna element).

The receiving antennas 414 can be positioned in a one-dimensional shape (e.g., a line) or a two-dimensional shape (e.g., a triangle, a rectangle, or an L-shape) for implementations that include three or more receiving antenna elements 414. In FIG. 4, the receiving antennas 414 are shown to be positioned according to a rectangular arrangement 416, a triangular arrangement 418, or an L-shape arrangement 420. While the one-dimensional shape enables the radar system 202 to measure one angular dimension (e.g., an azimuth or an elevation), the two-dimensional shape enables two angular dimensions to be measured (e.g., both azimuth and elevation).

Using at least a portion of the antennas 402, the radar system 202 can form beams that are steered or un-steered, wide or narrow, or shaped (e.g., as a hemisphere, cube, fan, cone, or cylinder). The one or more transmitting antennas may have an un-steered omnidirectional radiation pattern or may be able to produce a wide steerable beam. Either of these techniques enable the radar system 202 to illuminate a large volume of space. The radar system 202 is shown to produce a wide transmit beam 422. To achieve desired levels of angular accuracy and angular resolution, the receiving antennas 414 can be used to generate thousands of narrow steered beams (e.g., 2000 beams, 4000 beams, or 6000 beams) with digital beamforming, such as a narrow receive beam 424. In this way, the radar system 202 can efficiently monitor an external environment.

The radio-frequency front end 404 and the transceiver 406 include circuitry and logic for transmitting and receiving the radar signal 204 via the antennas 402. Components of the RF front end 404 or transceiver 406 can include amplifiers, mixers, switches, analog-to-digital converters, filters, and so forth for conditioning the radar signal 204. The transceiver 406 can also include logic to perform in-phase/quadrature (I/Q) operations, such as modulation or demodulation. A variety of different modulations can be used to produce the radar signal 204, including a linear frequency modulation, a triangular frequency modulation, a stepped frequency modulation, or a phase modulation. In some cases, the radar modulation can mitigate interference with other radar signals or wireless communication signals. The RF front end 404 and the transceiver 406 can support full-duplex operations or half-duplex operations to perform continuous wave or pulsed radar operations, respectively.

A frequency spectrum (e.g., range of frequencies) that the RF front end 404 and the antennas 402 may be tuned for can encompass frequencies between 1 and 300 GHz, between 4 and 100 GHz, between 24 and 60 GHz, or between 30 and 40 GHz. In some cases, the frequency spectrum can be divided into multiple sub-spectrums that have similar or different bandwidths. Example bandwidths can be on the order of 500 megahertz (MHz), one gigahertz (GHz), two gigahertz, and so forth. Different frequency sub-spectrums may correspond to or encompass unlicensed frequency bands or licensed frequency bands that are used for wireless communications. The transceiver 406 and the RF front end 404 can generate the radar signal 204 to have one or more frequencies within at least a portion of a licensed frequency band.

The processor 408 may be a single core processor or a multiple core processor composed of a variety of materials, such as silicon, polysilicon, high-K dielectric, copper, and so on. The processor 408 executes computer-readable instructions that are stored within the computer-readable storage media (CRM) 410. Example digital operations performed by the processor 408 can include Fast-Fourier transforms (FFTs), filtering, modulations or demodulations, signal processing, digital beamforming operations, machine learning, and so forth.

The control circuitry 412 may be implemented within or separate from the transceiver 406 and radio-frequency front end 404 as a modem, a general-purpose processor, a controller, fixed logic circuitry, hard-coded logic, some combination thereof, and so forth. Components of the control circuitry 412 can be localized at one module or one integrated circuit chip or can be distributed across multiple modules or chips. Although not explicitly shown, the control circuitry 412 can include at least one computer-readable storage media (e.g., the CRM 410) or can access the computer-readable storage media 212 to obtain computer-readable instructions.

The control circuitry 412 causes the radar system 202 to be in a transmit state or a non-transmit state. In the transmit state, the radar system 202 actively transmits a radar signal 204 (e.g., radiates an electromagnetic field). There are several different types of non-transmit states for which the radar system 202 may be in, including a receive state, a power-saving state (e.g., a partially-powered down state), or an inactive state (e.g., a powered-down state). The control circuitry 412 communicates with the radar request module 316 to determine the appropriate state for the radar system 202. Based on instructions provided via the radar request module 316, the control circuitry 412 can control times or durations for which the transmit state or non-transmit state occur. The control circuitry 412 can also customize or constrain transmission characteristics of the radar system 202 according to an authorization contingency. For example, the control circuitry 412 can cause the radar system 202 to use a particular duty cycle, pulse shape (e.g., pulse width), transmission power level, beam shape, scan angle (e.g., beam steering direction), modulation type, slew rate (e.g., frequency chirp rate), and so forth.

In some cases, at least a portion of the radar system 202 can be implemented using other components within the UE 110. For example, the antennas 402, the RF front end 404, the transceiver 406, the processor 408, or the computer-readable storage media 410 may be respectively implemented by the antennas 302, the RF front end 304, the 5G NR transceiver 308, the processor 310, or the computer-readable storage media 312 of FIG. 3. In this situation, the antennas 302, the radio-frequency front end 304, or the 5G NR transceiver 308 can transmit and receive signals for both wireless communication and radar operations. If the antennas 302 and the RF front end 304 support full-duplex or half-duplex operation, for example, the antennas 302 and the RF front end 304 can be used to enable the use of continuous-wave radar or pulse-Doppler radar techniques. The computer-readable storage media 312 may include a digital beamformer module that enables custom beamsteering and shaping for determining an angular position of the object. Using digital beamforming techniques, a variety of different types of beams can be transmitted or received using the antennas 302. If the 5G NR transceiver 308 performs I/Q modulation or demodulation operations, the 5G NR transceiver 308 can be programmed for radar-specific modulations that enable a range and Doppler of a object to be determined.

Controlling Radar Operations Associated with a Licensed Frequency Band

Figure 5:
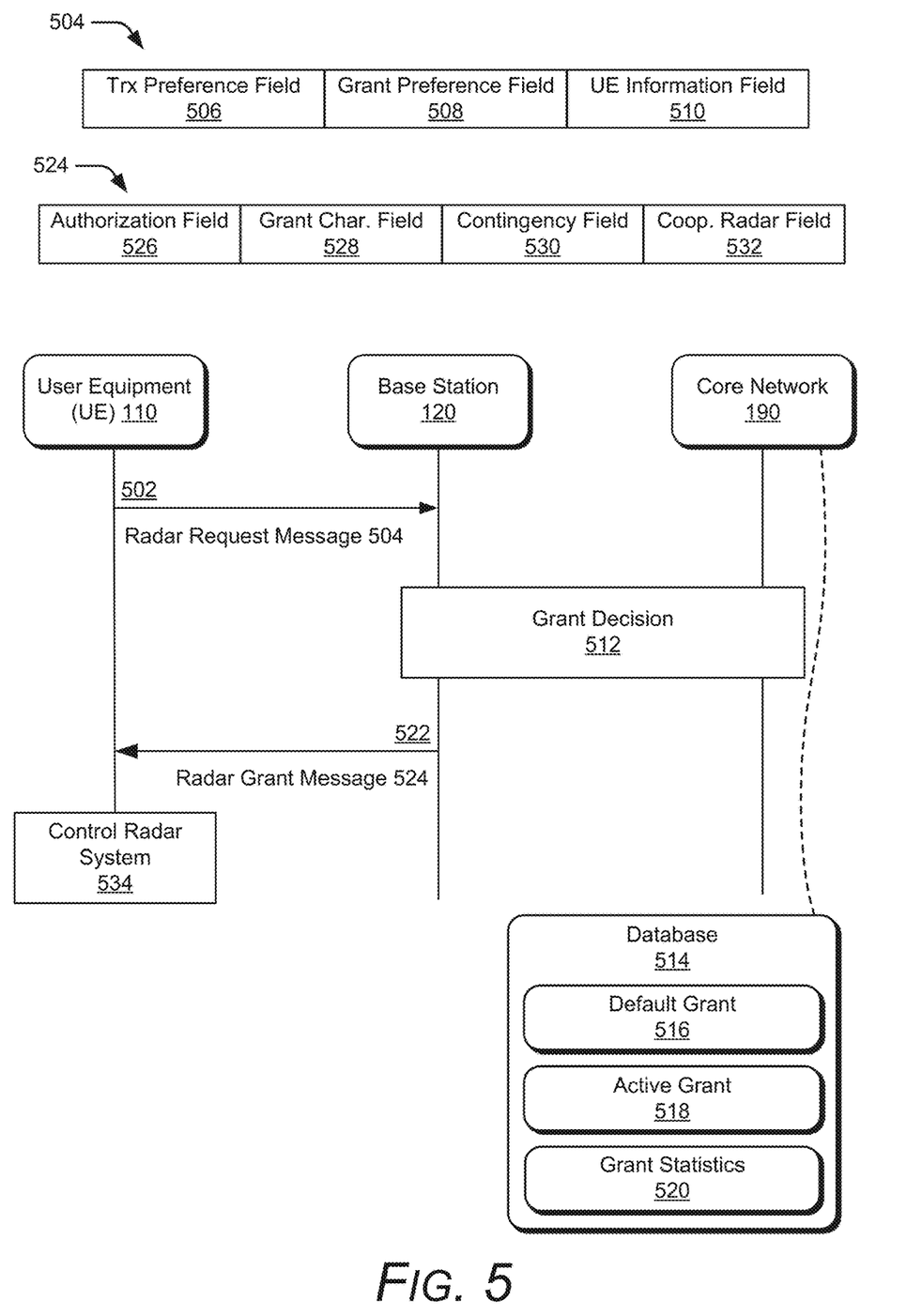
FIG. 5 illustrates details of example data and control transactions between devices engaged in controlling radar transmissions within a licensed frequency spectrum.

FIG. 5 illustrates details of example data and control transactions between devices engaged in controlling radar transmissions within a licensed frequency spectrum. At 502, the radar request module 316 of the UE 110 causes the LTE or 5G NR transceiver 306 or 308 to send a radar request message 504 to the base station 120. A purpose of the radar request message 504 is to request authorization for transmitting one or more radar signals 204 within one or more licensed frequency bands associated with coverage of a network (e.g., a 5G network).

An example radar request message 504 is depicted at the top of FIG. 5, and includes a transmission (Trx) preference field 506, a grant preference field 508, and a UE information field 510. Within the transmission preference field 506, the radar request module 316 can provide one or more transmission preferences of the radar system 202. Example types of transmission preferences can include a frequency or a range of frequencies (e.g., a center frequency and a bandwidth), a pulse shape (e.g., a pulse width), a modulation type, a transmission power level, a duty cycle, a scan angle, and so forth. These transmission preferences may be determined by the control circuitry 412 based on object characteristics (e.g., a predicted position of the object, a predicted velocity of the object, an estimated quantity of objects), environmental conditions (e.g., detected clutter), or based on the radar-based application (e.g., gesture recognition, presence detection, or collision avoidance). The transmission preferences can enable the radar system 202 to collect desired-fidelity data based on the current use case for the radar system 202. The control circuitry 412 can communicate these transmission preferences to the radar request module 316 for inclusion within the radar request message 504.

Within the grant preference field 508, the radar request module 316 can identify a desired duration for which authorization is requested, a scheduling preference for transmitting future radar request messages 504, and so forth. If the radar system 202 utilizes a predetermined amount of time to collect data for the radar-based application, for example, the radar request module 316 can include this amount of time within the grant preference field 508.

Within the UE information field 510, the radar request module 316 can include information about the UE 110, such as an identification of the UE 110, a physical location of the UE 110, capabilities of the radar system 202 (e.g., a range of selectable frequencies, a range of transmission power levels, or a range of scan angles), the radar-based application or current use case for the radar system 202 (e.g., gesture recognition, presence detection, or collision avoidance), and so forth. This information can be used by the core network 190 to determine whether or not to grant the UE 110 authorization, as further described below.

Different types of location information can be provided via the UE information field 510. For example, the radar request module 316 can provide global positioning system coordinates of the UE 110 or identifications of other base stations 120 that are detected by the UE 110. In addition to providing the identifications of the other base stations 120, the radar request module 316 can provide detected signals strengths associated with each of these base stations 120. This information can enable the physical location of the UE 110 to be determined using techniques such as triangulation in situations in which global positioning system coordinates are unavailable.

Responsive to receiving the radar request message 504, a grant decision is made at 512. The decision can be made by the radar grant module 366 of the base station 120, by the radar interference manager 164 of the core network 190, or by both the radar grant module 366 and the radar interference manager 164 in conjunction. In some cases, the decision is based on information provided via the radar interference manager 164 or the UE information field 510. At 512, the radar grant module 366 and the radar interference manager 164 can communicate with each other via the core network interface 370. The radar grant module 366, for example, can pass on information within the radar request message 504 to the radar interference manager 164 or the radar interference manager 164 can pass on information from a database 514 to the radar request module 316.

Generally, the radar interference manager 164 stores and maintains the database 514, which can include at least one default grant 516 or at least one active grant 518, as shown at the bottom of FIG. 5. The default grant 516 can be specified by the network provider to identify a condition or situation for which a UE 110 is authorized, authorized with contingencies, or denied authorization for transmitting a radar signal 204 within one or more licensed frequency bands. The condition may be associated with a particular licensed frequency band and can identify a certain geographic area, a network coverage situation (e.g., whether or not a particular type of network coverage is available), performance thresholds (e.g., interference levels), and so forth.

The active grants 518 identify which UEs 110 are currently authorized and can also include a time frame associated with the current authorizations or respective locations of the UEs 110 that are currently authorized. With the active grants 518, the radar interference module 164 can maintain knowledge of authorized radar transmissions. Information within the active grants 518 may also be used to collect grant statistics 520, which are further described below.

The radar interference module 164 can collect information regarding interference measurements or performance impacts to wireless communications within the grant statics 520 portion of the database 514 to assess an impact of authorizing radar transmissions within the licensed frequency band. In some cases, these performance measurements are provided to the radar interference manager 164 via the base station 120. The grant statics 520 may also include statistics regarding a how often radar request messages 504 are received, quantities of UEs 110 that are authorized at a given time within a geographic area for a particular licensed frequency band, and so forth. A network provider may analyze the grant statics 520 off-line to determine appropriate adjustments to the default grants 516 or to determine adjustments to controlling radar transmissions in general. In some implementations, the radar interference manager 164 can monitor and analyze the grant statics 520 and make real-time adjustments to control an amount of interference that is present within the licensed frequency band.

For example, if the grant statistics 520 indicate radar transmissions are adversely affecting wireless communications, the radar interference manager 164 can instruct the radar grant module 366 to not authorize the UE 110 or revoke authorization 366 for previously authorized UEs 110. In some situations, the radar interference manager 164 can instruct the radar grant module 366 to authorize and coordinate cooperative radar operations (e.g., bi-static radar, multi-static radar, or network radar) between multiple UEs 110 to reduce a total quantity of UEs 110 that actively transmit radar signals 204 within the licensed frequency band. In some cases, authorization may be granted according to each UE 110's capability and location within a given region. For example, a UE 110 with a highest transmit power or a wider field-of-view, for example, can be given authorization to transmit the radar signal 204 while the other UEs 110 are denied authorization. Time or power costs associated with transmitting the radar signal 204 can also be distributed across the multiple UEs 110 through cooperative radar techniques, thereby enabling UEs 110 with limited resources to perform radar sensing.

Alternatively if the grant statistics 520 indicate the radar transmissions are not adversely affecting wireless communications, the radar interference manager 164 can instruct the radar grant module 366 to authorize larger quantities of UEs 110, issue authorizations without contingencies, or remove contingencies for previously authorized UEs 110. At 512, the radar interference manager 164 may pass on information within the database 514 to the radar grant module 366 such that the radar grant module 366 can make decisions regarding whether or not to authorize the UE 110 and whether or not to specify one or more contingencies.

At 522, the radar grant module 366 sends a radar grant message 524 to the UE 110 based on the grant decision 512. The radar grant message 524 identifies whether or not the UE 110 is authorized to transmit the radar signal 204 within the licensed frequency band. In some cases, the authorization may be for a single instance or time frame. Afterwards, the radar request module 316 is to send a second radar request message 504. In other cases, the authorization is valid until a second radar grant message 524 is sent from the radar grant module 366 that revokes the authorization. The authorization may be continuous in time or over intermittent time periods.

An example radar grant message 524 is depicted towards the top of FIG. 5 and is shown to include an authorization field 526, a grant characteristic field 528, a contingency field 530, and a cooperative radar field 532. The authorization field 526 indicates whether or not authorization is granted for one or more licensed frequency bands associated with coverage of a network. The grant characteristic field 528 can indicate a duration for which the authorization is granted, a specific geographic region for which the authorization is granted, conditions for which future radar request messages 504 are to be sent, a time slot (e.g., time resources available for radar transmission), a timing pattern of multiple radar transmissions, frequency resources available for radar transmission, and so forth. In some aspects, the time slot corresponds to a time in which wireless communications are not performed by the UE 110 and/or other proximate UEs. In some situations, the grant characteristic field 528 can reduce a quantity of radar request messages 504 that are sent to the base station 120, thereby freeing time or frequency resources for other wireless communication operations.

The contingency field 530 can indicate if there are any transmission characteristics that are permitted or prohibited. The contingencies can indicate, for example, specific frequencies, pulse shapes, modulation types, transmission power levels, duty cycles, scan angles, and so forth. In general, the contingencies can mitigate interference within the licensed frequency band for both wireless communication operations and other radar operations. For example, the radar grant module 366 can use the contingency field 530 to prevent the radar system 202 from interfering with wireless communications performed by other nearby UEs by controlling the frequency of the radar signal 204, causing the radar system 202 to avoid radiating in a direction of the other nearby UEs, or causing the radar system 202 to use a low-power mode for transmitting the radar signal 204.

Within the cooperative radar field 532, the radar grant module 366 can coordinate radar operations of the UE 110 with at least another UE to employ cooperative radar techniques. Instead of granting the UE 110 authorization to transmit within the licensed frequency band, the radar grant module 366 passes information to the radar request module 316 that enables the radar system 202 to operate as part of a bi-static radar, multi-static, or network radar. In particular, the cooperative radar field 532 can provide information associated with a second UE that is authorized to transmit within the licensed frequency band and that is proximate to the UE 110 such that the UE 110 can detect the radar transmissions of the second UE. This information can include, for example, transmission timing information and general transmission characteristics (e.g., frequency, duty cycle, or modulation type) that the radar grant module 366 provided authorization for.

In some aspects, the cooperative radar field 532 can be used to pass radar data that is collected through cooperative or non-cooperative techniques by other UEs to the radar system 202 of the UE 110. This radar data can identify locations of objects or clutter that are detected within an external environment. This may enable the UE 110 to maintain awareness of the external environment during time periods for which it is not authorized to transmit radar signals 204. The radar data can also be used by the radar system 202 to improve probability of detection, improve location accuracy, improve object tracking, improve object orientation and shape estimation, reduce false alarms, perform triangulation, or support interferometry.

Although not explicitly shown, some radar grant messages 524 may also pass along information regarding the default grants 516 (e.g., which geographic locations or network coverage situations the UE 110 is provided authorization by default). With knowledge of the default grants 516, the radar request module 316 can determine if the authorization is granted in situations in which the radar request module 316 is unable to communicate with the core network 190, as further described with respect to FIG. 6. In general, the radar request message 504 or the radar grant message 524 may be communicated using 4G standards or 5G standards. In some cases, the radar request message 504 and the radar grant message 524 may utilize different 5G carriers, such as a sub-6 GHz carrier, or supplementary uplink (SUL).

Responsive to receiving the radar grant message 524, the radar request module 316 controls the radar system 202 at 534. For example, the radar request module 316 can configure the radar system 202 by informing the control circuitry 412 of whether or not the UE 110 is authorized to transmit the radar signal 204 within the licensed frequency band and if there are any contingencies. The control circuitry 412 may then cause the radar system 202 to be in an appropriate state and cause the radar system 202 to comply with the contingencies.

Different situations may change how the radar transmissions are controlled. In particular, as the UE 110 moves around to different geographic locations, the UE 110 may be in an area that does or does not provide coverage (e.g., service) for a 5G network or a 4G network, as further described with respect to FIG. 6.

Figure 6:
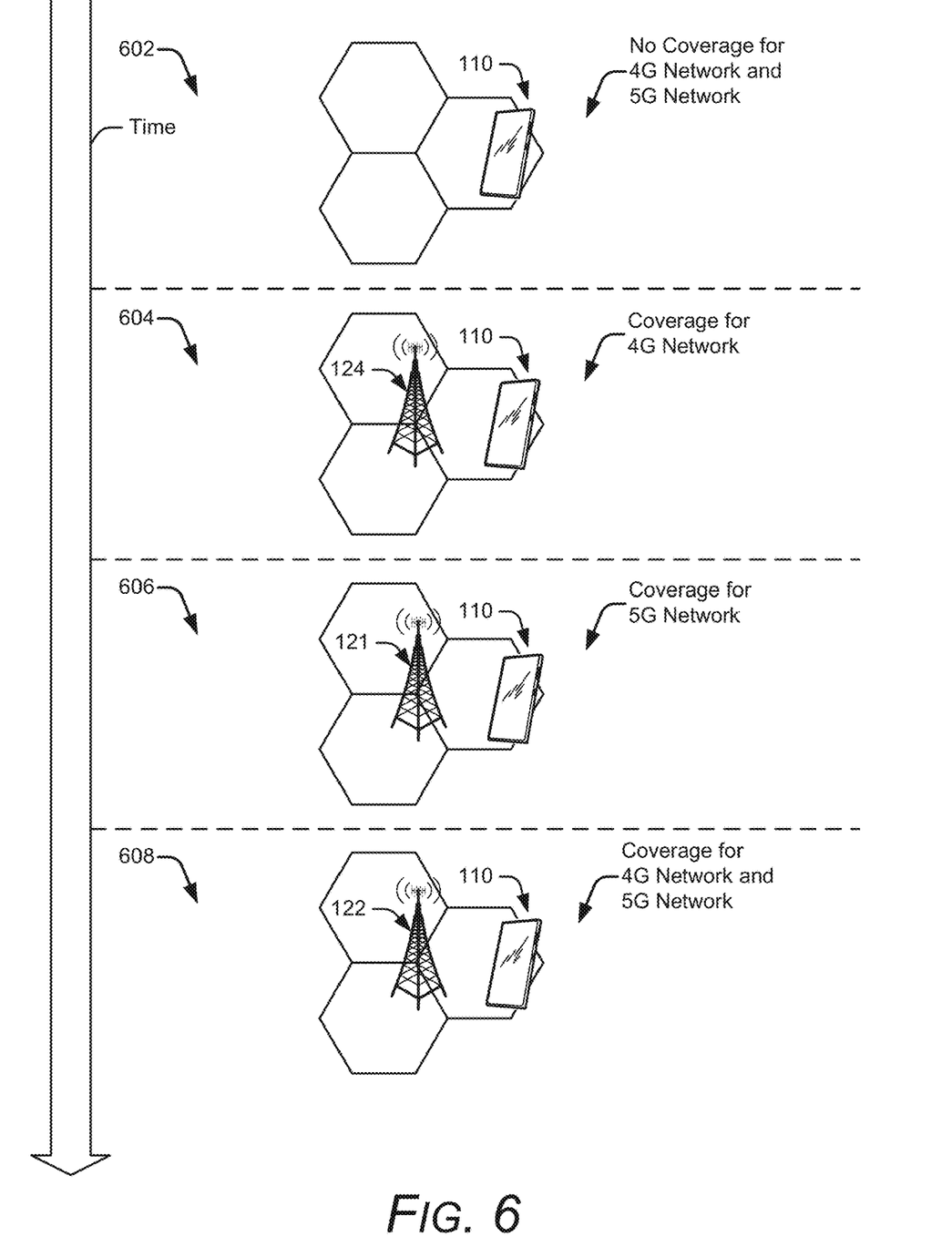
FIG. 6 illustrates an example sequence flow diagram for controlling radar transmissions within a licensed frequency band.

FIG. 6 illustrates an example sequence flow diagram for controlling radar transmissions within a licensed frequency band, with time flowing in a downward direction. In FIG. 6, the UE 110 moves to different geographic locations that vary in terms of network coverage. In the examples described below, the licensed frequency band is assumed to be associated with coverage of a 5G network (e.g., include at least a portion of frequencies between approximately 6 and 300 GHz).

At 602, the UE 110 is in a geographic location that does not have coverage for both the 4G network and the 5G network. Therefore, use of a licensed frequency band for radar operations does not adversely impact wireless communication operations. If the UE 110 does not have authorization to transmit on the licensed frequency band, its radar system 202 cannot be operated in a transmit state associated with the licensed frequency band. Instead, the radar system 202 can use an unlicensed frequency band and operate in a transmit state associated with the unlicensed frequency band, operate in a receive state for bistatic radar operations, or operate in a power-saving state or a non-transmit state. In this example, however, the radar request module 316 previously received authorization or information (e.g., the default grants 516 or a list of authorized geographic regions via the grant characteristic field 528) that enables the radar system 202 to utilize the licensed frequency band in this geographic location or network coverage situation. In this example, the radar system 202 may have unrestricted use of the licensed frequency band for transmitting the radar signal 204.

At 604, the UE 110 is in a geographic location that has coverage for 4G network and no coverage for the 5G network. In this situation, use of licensed frequency bands associated with the 5G network coverage may be used by the radar system 202 when authorization is received through a 4G communication link. Because the 4G network is available, the radar request message 504 and the radar grant message 524 can be communicated via the wireless link 132 of FIG. 1 using the LTE transceiver 306 of the UE 110 and LTE transceivers 356 of the base station 124. With the transmission of the radar request message 504, the radar interference manager 164 can update the active grant 518 or grant statistics 520. The radar grant module 366 of the base station 124 can grant the UE 110 unrestricted use of the licensed frequency band associated with the 5G network coverage for transmitting the radar signal 204. In other cases, the radar grant module 366 can coordinate radar operations between multiple UEs 110 within the geographic location to reduce interference for radar operations.

At 606, the UE 110 is in a geographic location that has coverage for the 5G network and no coverage for the 4G network. In this situation, the radar request message 504 and the radar grant message 524 can be communicated via the wireless link 131 of FIG. 1 using the 5G NR transceiver 308 of the UE 110 and the 5G NR transceivers 356 of the base station 121. Depending on the situation, the radar grant module 366 may or may not grant authorization to the UE 110 to transmit the radar signal 204 within the licensed frequency band associated with coverage of the 5G network, as described above with respect to FIG. 5.

At 608, the UE 110 is in a geographic location that has coverage for both the 4G network and the 4G network. To reduce traffic to the 5G network, the radar request message 504 and the radar grant message 524 can be transmitted using 4G standards to and from the 4G network. Depending on the situation, the radar grant module 366 may or may not grant authorization to the UE 110 to transmit the radar signal 204 within the licensed frequency band associated with coverage of the 5G network, as described above with respect to FIG. 5.

Although the controlling of radar transmissions within the licensed frequency band are described with respect to 5G wireless communications and 5G licensed frequencies, the techniques described herein can be applied to other portions of the frequency spectrum and other wireless communication standards (e.g., for licensed frequencies between approximately 1 and 6 GHz).

Example Method

Figure 7:
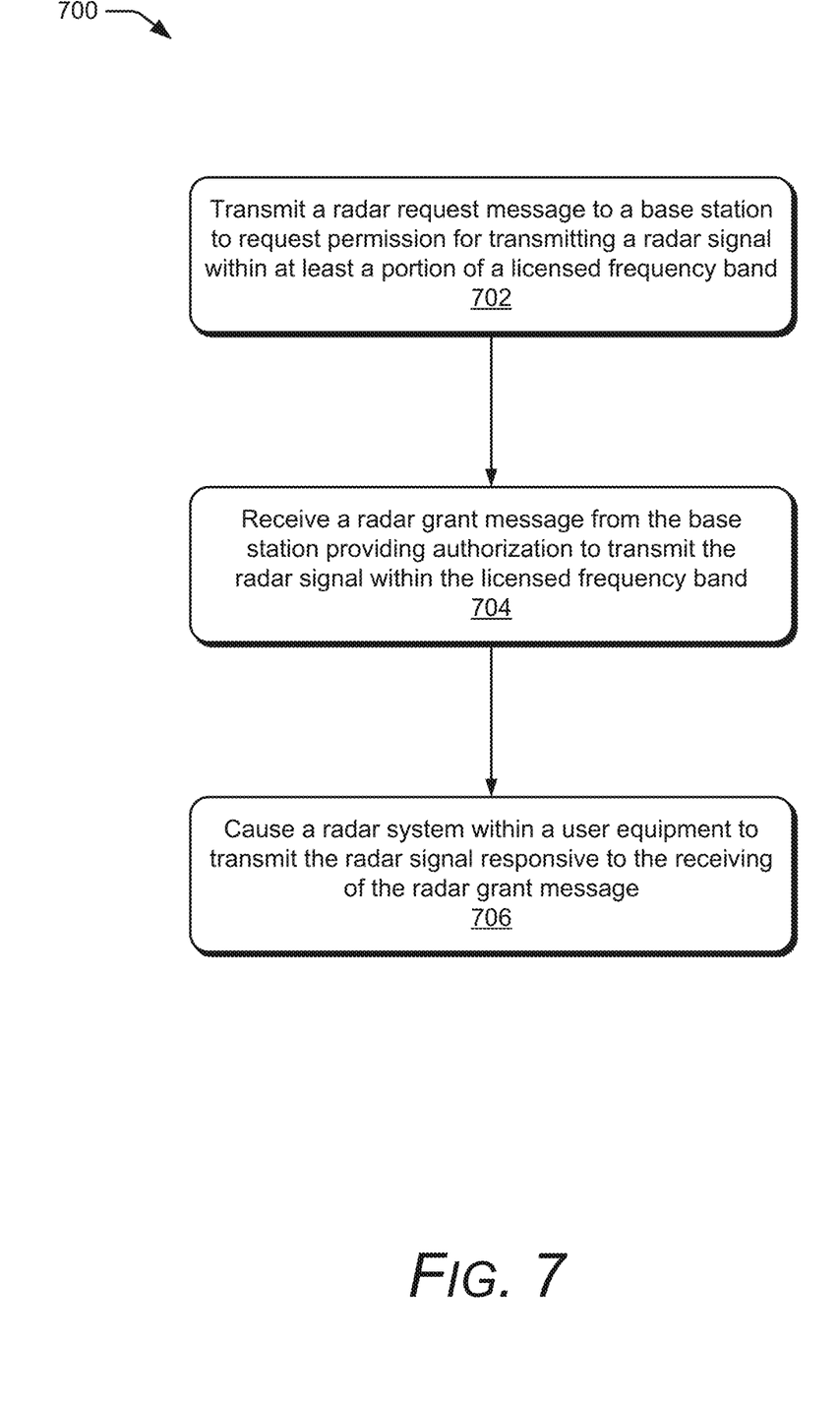
FIG. 7 illustrates an example method for controlling radar transmissions within a licensed frequency band.

FIG. 7 depicts an example method 700 for controlling radar transmissions within a licensed frequency band. Method 700 is shown as a set of operations (or acts) performed but not necessarily limited to the order or combinations in which the operations are illustrated. Further, any of one or more of the operations may be repeated, combined, reorganized, or linked to provide a wide array of additional and/or alternate methods. In portions of the following discussion, reference may be made to environment 100 of FIG. 1 or 208, 210, or 212 of FIG. 2 and entities detailed in FIGS. 3 and 4, reference to which is made for example only. The techniques are not limited to performance by one entity or multiple entities operating on one device.

At 702 a radar request message is transmitted to a base station to request permission for transmitting a radar signal within at least a portion of a licensed frequency band. For example, the radar request module 316 of the UE 110 causes the UE 110 to transmit the radar request message 504 to the base station 120 to request permission for transmitting the radar signal 204 within at least a portion of a licensed frequency band. The licensed frequency band for which the radar request message 504 corresponds to may be associated with coverage of a network that the base station 120 is affiliated with. In some cases, the licensed frequency band may include a portion of frequencies between 6 and 300 GHz and the network may comprise a 5G network. In other cases, the licensed frequency band may include a portion of frequencies between 1 and 6 GHz and the network may comprise a 4G network. Depending on the type of network coverage available, the radar request message 504 can be sent to the gNB 121 or the eNB 124, as shown in FIG. 6.

At 704, a radar grant message is received from the base station providing authorization to transmit the radar signal within the licensed frequency band. For example, the radar request module 316 receives the radar grant message 524 from the base station 120 providing authorization to transmit the radar signal 204 within the licensed frequency band. The radar grant module 366 of the base station 120 can send the radar grant message 524 to the radar request module 316 based on a decision of whether or not to grant the UE 110 authorization. The decision may be made based on the physical location of the UE 110, a quantity of nearby UEs, a quantity of nearby UEs that have current authorizations, an amount of interference within the licensed frequency band, and so forth. Sometime, authorization may be granted with one or more contingencies. These contingencies may identify certain transmission characteristics that are permitted or prohibited to reduce the interference.

At 706, a radar system within a user equipment is caused to transmit the radar signal responsive to the receiving of the radar grant message. For example, the radar request module 316 causes the radar system 202 within the UE 110 to transmit the radar signal 204 responsive to the receiving of the radar grant message 524. The radar request module 316 can communicate with the control circuitry 412 of the radar system 202 and cause the control circuitry 412 to configure the radar system 202 according to a transmit state. Alternatively if the radar grant message 524 does not provide the UE 110 authorization, the radar request module 316 can cause the control circuitry 412 to configure the radar system 202 according to a non-transmit state, such as a receive state or a power-saving state.

Conclusion

Although techniques for controlling radar transmissions within a licensed frequency band have been described in language specific to features and/or methods, it is to be understood that the subject of the appended claims is not necessarily limited to the specific features or methods described. Rather, the specific features and methods are disclosed as example implementations of controlling radar transmissions within a licensed frequency band.

What is claimed is:

1. A method performed by a user equipment, the method comprising:
   transmitting a radar request message to a base station to request permission for transmitting a radar signal within at least a portion of a licensed frequency band associated with coverage of a cellular network, the radar request message including a transmission preference field for specifying at least a preferred frequency within the portion of the licensed frequency band for transmitting the radar signal;
   receiving a radar grant message from the base station providing authorization to transmit the radar signal using the preferred frequency within the portion of the licensed frequency band associated with coverage of the cellular network; and
   transmitting, using a radar system within the user equipment, the radar signal using the preferred frequency within the portion of the licensed frequency band associated with the coverage of the cellular network responsive to the receiving of the radar grant message.

2. The method of claim 1, wherein the licensed frequency band includes at least a portion of frequencies between approximately 24 and 300 gigahertz (GHz).

3. The method of claim 1, wherein the transmitting of the radar request message comprises transmitting the radar request message to a Evolved Universal Terrestrial Radio Access Network Node B (eNB) using a Fourth-Generation (4G) communication standard.

4. The method of claim 1, wherein the transmitting of the radar request message comprises transmitting the radar request message to a Next Generation Node B (gNB) using a Fifth-Generation (5G) communication standard.

5. The method of claim 1, wherein the transmitting of the radar request message comprises providing information associated with a physical location of the user equipment to the base station within the radar request message.

6. The method of claim 5, wherein the information associated with the physical location of the user equipment comprises at least one of the following:
- global positioning system coordinates of the user equipment;
- identifications of other base stations that are nearby the user equipment; or
- detected signals strengths of other base stations.

7. The method of claim 1, wherein the transmitting of the radar request message comprises providing at least one other transmission preference of the radar system including at least one of the following:
- a pulse shape;
- a modulation type;
- slew rate;
- a transmission power level;
- a duty cycle; or
- a scan angle.

8. The method of claim 1, further comprising:
- based on the radar grant message, transmitting a second radar signal using the radar system after the radar signal is transmitted.

9. The method of claim 1, further comprising:
- transmitting a second radar request message to the base station to request permission for transmitting a second radar signal within at least a second portion of the licensed frequency band associated with coverage of the cellular network;
- receiving a second radar grant message from the base station denying the request to transmit the second radar signal; and
- directing the radar system to not transmit the second radar signal responsive to the receiving of the second radar grant message.

10. The method of claim 1, wherein transmitting the radar request message to request permission for transmitting the radar signal within at least the portion of the licensed frequency band further comprises:
- transmitting the radar request message based on using the portion of the licensed frequency band for a radar-based application.

11. A user equipment configured to:
- transmit a radar request message to a base station to request permission for transmitting a radar signal within at least a portion of a licensed frequency band associated with coverage of a cellular network, the radar request message including a transmission preference field for specifying at least a preferred frequency within the portion of the licensed frequency band for transmitting the radar signal; and
- receive a radar grant message from the base station providing authorization to transmit the radar signal using the preferred frequency within the portion of the licensed frequency band associated with coverage of the cellular network,
the user equipment comprising a radar system, the radar system configured to transmit the radar signal using the preferred frequency within the portion of the licensed frequency band associated with the coverage of the cellular network responsive to the user equipment receiving the radar grant message.

12. The user equipment of claim 11, further comprising:
- antennas;
- a radio-frequency front end; and
- a transceiver,
wherein the antennas, the radio-frequency front end, and the transceiver are jointly configured to:
- transmit the radar request message; and
- receive the radar grant message.

13. The user equipment of claim 12, wherein:
- the radar system comprises the antennas, the radio-frequency front end, and the transceiver; and
- the antennas, the radio-frequency front end, and the transceiver are jointly configured to transmit the radar signal.

14. The user equipment of claim 12, wherein:
the radar system comprises:
- other antennas;
- a second radio-frequency front end; and
- a second transceiver,
- the other antennas, the second radio-frequency front end, and the second transceiver jointly configured to transmit the radar signal.

15. The user equipment of claim 11, wherein the user equipment is further configured to:
- transmit the radar request message to a Evolved Universal Terrestrial Radio Access Network Node B (eNB) using a Fourth-Generation (4G) communication standard; or
- transmit the radar request message to a Next Generation Node B (gNB) using a Fifth-Generation (5G) communication standard.

16. The user equipment of claim 11, further configured to:
- transmit the radar request message based on using the portion of the licensed frequency band for a radar-based application.

17. A method performed by a base station, the method comprising:
- receiving, from a user equipment, a radar request message that requests permission to transmit a radar signal within at least a portion of a licensed frequency band associated with coverage of a cellular network, the radar request message including a transmission preference field for specifying at least a preferred frequency within the portion of the licensed frequency band for transmitting the radar signal;
- responsive to receiving the radar request message, determining whether to grant or deny the user equipment's request; and
- responsive to determining to grant the user equipment's request, transmitting, to the user equipment, a radar grant message that authorizes the user equipment to transmit the radar signal using the preferred frequency within at least the portion of the licensed frequency band associated with the coverage of the cellular network.

18. The method of claim 17, wherein:
- the base station is associated with a first cellular network;
- the licensed frequency band is associated with an area of coverage provided by a second cellular network; and
- the determining of whether to grant or deny the user equipment's request comprises:
  - determining whether or not the user equipment is in a geographic location that is within the area of coverage; and determining to grant the user equipment's request based on the geographic location being outside of the area of coverage; or determining to deny the user equipment's request based on the geographic location being within the area of coverage.

19. The method of claim 17, wherein the radar grant message includes one or more contingencies associated with one or more of the following:
   a transmission frequency of the radar signal;
   a pulse shape of the radar signal;
   a modulation type of the radar signal;
   a transmission power level of the radar signal;
   a duty cycle of the radar signal; or
   a scan angle of the radar signal.

20. The method of claim 17, further comprising:
   communicating with a radar interference manager associated with the base station, the licensed frequency band associated with the base station; and
   obtaining a default grant from the radar interference manager,
   wherein the determining whether to grant or deny the user equipment's request comprises determining whether to grant or deny the user equipment's request based on the default grant.

21. The method of claim 17, further comprising:
   transmitting a second radar grant message that revokes the authorization provided by the radar grant message.

22. The method of claim 17, wherein the radar request message includes information associated with a physical location of the user equipment, the information comprising at least one of the following:
   global positioning system coordinates of the user equipment;
   identifications of other base stations that are nearby the user equipment; or
   detected signals strengths of the other base stations.

* * * * *